United States Patent [19]

Waite

[11] 4,433,641
[45] Feb. 28, 1984

[54] BABY PIG FEEDER

[76] Inventor: Dwaine C. Waite, Rte. 2, Harrison County, Woodbine, Iowa 51679

[21] Appl. No.: 409,210

[22] Filed: Aug. 18, 1982

[51] Int. Cl.³ .............................................. A01K 5/00
[52] U.S. Cl. .................................................... 119/53
[58] Field of Search ................................ 119/53, 53.5

[56] References Cited

U.S. PATENT DOCUMENTS

| | | | |
|---|---|---|---|
| 2,496,828 | 2/1950 | Throckmorton | 119/53 |
| 2,515,698 | 7/1950 | Cosby | 119/53 |
| 2,721,537 | 10/1955 | Miller | 119/53 |
| 2,933,064 | 4/1960 | Geerlings | 119/53 |
| 3,074,376 | 1/1963 | Lucklum | 119/53 |
| 3,105,463 | 10/1963 | Pilch | 119/52 |
| 3,134,361 | 5/1964 | Decker | 119/53 |
| 3,203,397 | 8/1965 | Henry | 119/53 |

FOREIGN PATENT DOCUMENTS 935868  9/1963  United Kingdom ................. 119/53

Primary Examiner—Hugh R. Chamblee
Attorney, Agent, or Firm—E. Robert Newman

[57] ABSTRACT

A device for feeding baby pigs and other livestock comprising a feed pan (20), a support post assembly (30) and a hopper assembly (40), hopper assembly (40) being capable of having its vertical height above pan (20) varied by the insertion of a pin (38) through a hole (36) in a support post (34), support post (34) running through a plurality of vertically spaced and aligned washers (46) which fixedly support a cylinder element (41) of hopper (40), the selection of the washer (46) which will rest on pin (36) determining the height of hopper (40). Also provided are dividing bars (23) for separating feeding animals which do not extend to the bottom of pan (20) thus allowing easy cleaning and a handle (47) for assisting in adjusting the hopper height and for carrying the device (10).

6 Claims, 2 Drawing Figures

BABY PIG FEEDER

TECHNICAL FIELD

The present invention relates generally to feeding devices which are required to deliver feed, having a granular size which varies from time to time, to baby pigs and other animals. This goal is accomplished conventionally by varying the height of the lower opening of a storage hopper above a feed pan. More specifically, the present device utilizes a non-threaded height adjustment apparatus which reduces the probability of clogging and jamming in the prior art.

BACKGROUND ART

The increasing cost of livestock production has reinforced the need for efficient and reliable animal feeding devices. Specifically, the need is present for a feeding device which delivers feed of varying granular size at desirable rates which requires minimal maintenance, and suffers less down-time.

Feeders of this type utilize means by which the lower opening of a feed storage hopper is raised or lowered so as to vary space between the vessel and a collection pan. To accomplish this, most prior art devices utilize threaded adjustment means (U.S. Pat. No. 3,134,361 to Decker; U.S. Pat. No. 2,933,064 to Geerings). Other systems utilize support posts having a plurality of small holes through which a bolt is inserted, the position of said bolt determining the height of the hopper. (U.S. Pat. No. 2,496,828 to Throckmorton).

In actual use, the aforesaid types of feeders all effectively control feed flow. However, they present the distinct potential for maintenance problems. The adjustment parts of devices with screw adjustment means readily rust together or become jammed when exposed to feed material and/or dust and grime. Likewise, systems with a plurality of small open holes in a support post are susceptible to clogging with excess feed material. In addition, such devices typically divide the pan into individual feed sections with vertical dividers which meet the pan bottom and side.

DISCLOSURE OF THE INVENTION

An object of the present invention is to provide an improved animal feeding device.

Another object of the invention is the provision of an animal feeding device having the capability for delivering either bulky-sized or small-grain-sized feed at desirable delivery rates.

A further object of the invention is to provide an animal feeding device having an adjustable hopper height arrangement whose parts are not likely to clog with foreign matter and/or rust together.

Still another object of the present invention is to provide a device which incorporates feed divider bars elevated from the surface of said feeding pan, thereby facilitating orderly animal consumption of feed material and, at the same time, cleaning of the pan of said device.

Yet another object of the invention is to provide a feeding device which, when used, contains no open holes in which excess feed material can collect.

In a more general sense, it is an object of this invention to provide a portable device particularly suited to feeding baby pigs, but adaptable to other animals, comprising a feed hopper which may be selectively raised or lowered in order to control the flow of feeds composed of different granular sizes into a feeding pan at the bottom of the device. The height of a cylindrical portion of the hopper is adjusted by a series of vertically spaced horizontal height adjustment members in the form of washers attached between two parallel vertical straps which in turn are supported by the inner wall of the cylinder. A support post, which passes through the washers, is supported by legs having vertical elements which together form a guide for the cylindrical portion of the hopper. The support post has a single horizontal hole through it through which a pin is inserted, one of the washers then resting on said pin. The selection of the washer which will rest upon the pin will determine the height of the bottom of the cylinder above the pan. The desired height, in turn depends on the granular size of the feed material and the rate at which feed is consumed.

The single opening in the post and the openings in each washer always have another element of the same, but slightly smaller conformation, within them during operation. Thus, most opportunity for foreign matter to build up within the openings is avoided. In addition, no threaded parts are employed. Divider bars separate the pan into sections without intersecting with the pan bottom. Therefore, the device disclosed herein presents a high potential for reliability which is not present in the prior art.

These and other objects, advantages and novel features of the present invention will become apparent from the following detailed description of the invention when considered in conjunction with the accompanying drawing.

BEST MODE FOR CARRYING OUT THE INVENTION

Figure 1:
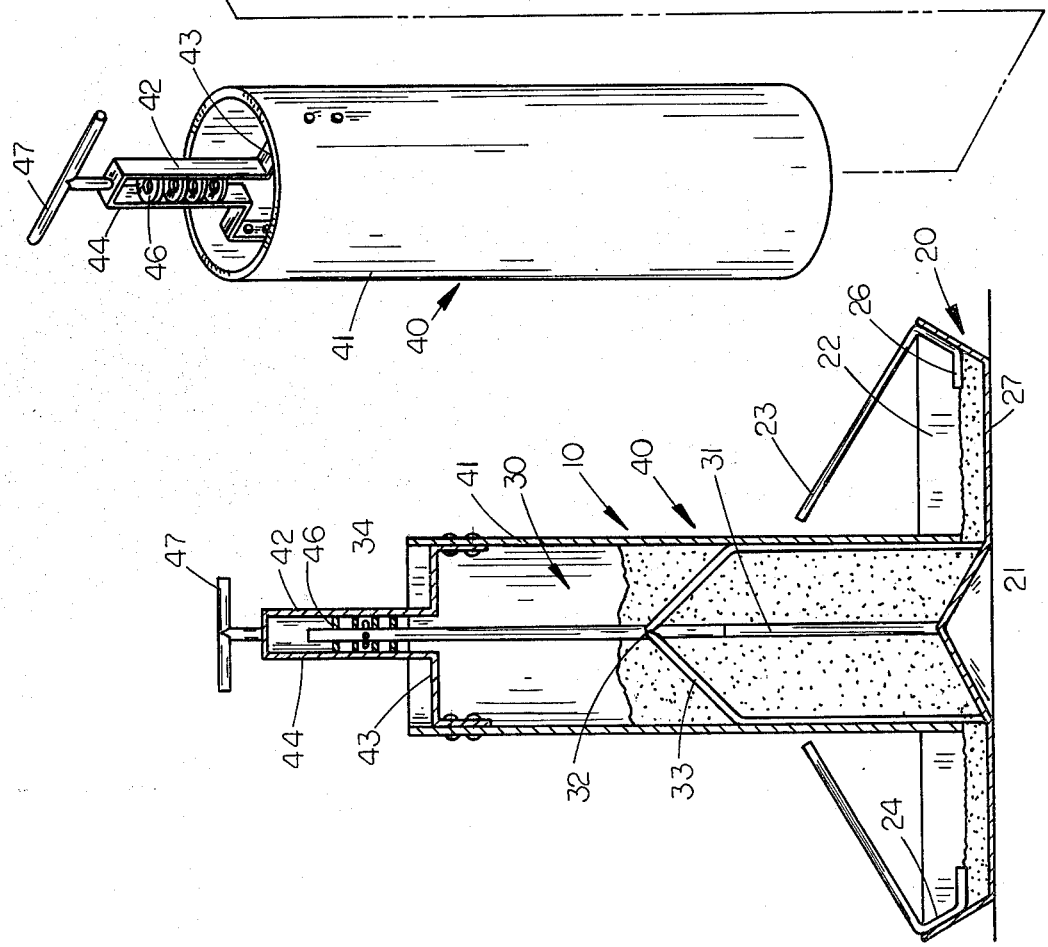
FIG. 1 is a sectional view of the feeding device disclosed herein.

Referring now to the drawings wherein like reference numerals designate identical or corresponding parts throughout the various views, and more particularly to FIG. 1, whereon the device disclosed herein is designated generally at (10), device (10) includes a feed collection pan (20), a central, intra-cylinder tripod support assembly (30), and a feed hopper assembly (40).

Feed collection pan (20) is pan-shaped except for a shallow center cone-shaped portion (21) which serves to direct feed in all directions as it gravity flows from hopper (30). Evenly spaced about the perimeter wall (22) of pan (20) are a plurality of J-shaped divider bars (23) which serve to separate animals as they feed from pan (20). Divider bars (23) are attached at the lower element (24) of their "J" shape to wall (22) of pan (20) and the shorter vertical element (26) of their "J" shape is parallel to and above the bottom (27) of pan (20). Thus, when cleaning the bottom (27) of pan (20) obstructions in corners resulting from the use of vertical divider walls, as is conventional, are avoided.

Figure 2:
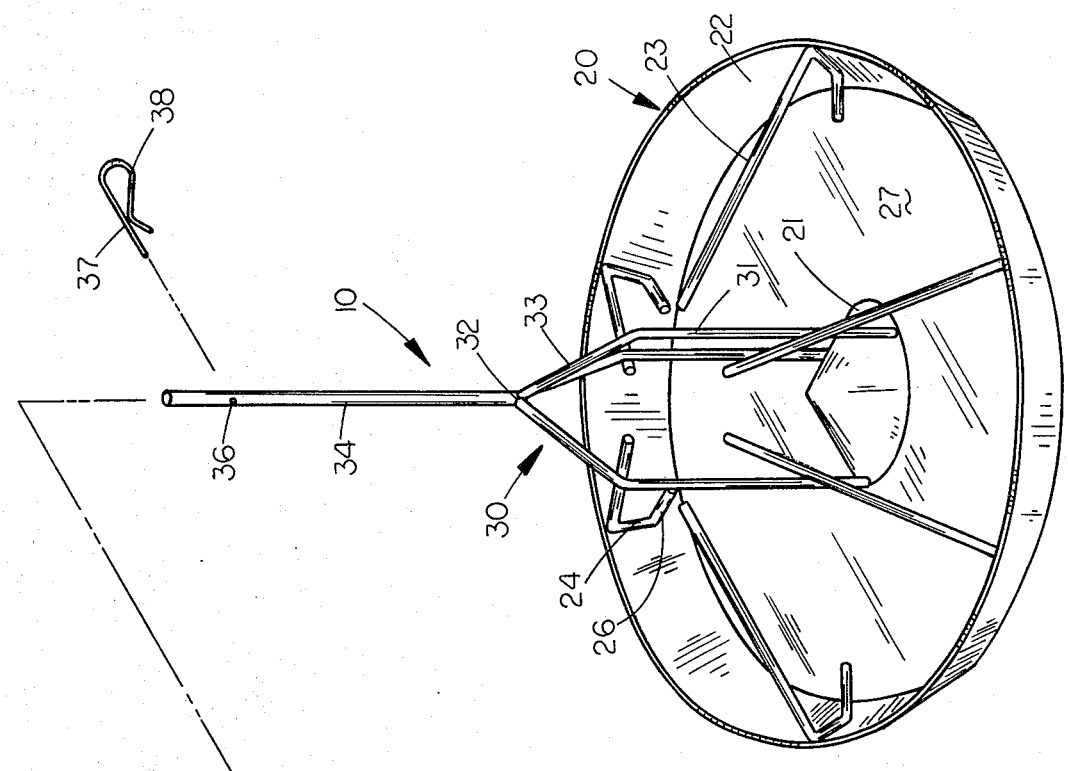
FIG. 2 is an exploded perspective view of the feeding device disclosed herein.

The central intra-cylinder tripod support assembly (30) stands on three vertical legs (31) which are affixed to bottom (27) of pan (20) at about where cone-shaped portion (21) of feed pan (20) intersects therewith. Angling inward from the upper end of each vertical leg (31) to meet at a central point (32) are upper elements (33) thereof. Vertical support post (34) extends upwardly from point (32). Vertical support post (34) has a horizontal hole (36) extending through it near its upper end, hole (36) being sized to receive the straight element (37) of snap clip (38) (seen only in FIG. 2).

Feed hopper assembly (40) has a cylindrical element (41) of a diameter slightly larger than the diameter of the cylinder circumscribed by vertical legs (31) about point (32), thus permitting its horizontal position to be stabilized thereby enabling it to be guided upwardly and downwardly, also by said legs (31). The height of cylinder (41) is such that when it is in its lowermost position resting on the bottom (27) of pan (20), it is somewhat below hole (36).

Affixed at diametrically opposing points within the upper end of cylinder element (41) of feed hopper (40) is symmetrically shaped strap (42). Strap (42) is comprised of a lower inverted U-shaped portion (43) and an upper inverted U-shaped portion (44), the horizontal element of portion (43) being void in its center where portion (44) is affixed thereto. Interconnecting the vertical portions of upper inverted U-shaped portion (44) of symmetrical strap (42) are a plurality of horizontal washers (46). Horizontal washers (46) are aligned and positioned such that supporting post (34) will substantially fill their center apertures and slide easily therethrough, the height of central tripod support assembly (30) and the location therein of hole (36) being such that feed hopper (40) may be adjusted to various heights above the bottom (27) of pan (20) when snap pin (38) is inserted through hole (36) and an elected washer (46) is allowed to rest atop the snap pin (38).

Completing feed hopper (40) is a handle (47) attached to the horizontal element of upper inverted U-shaped portion (44) of strap (42) which permits the device (10) to be manually moved from location to location by lifting upwards thereupon until snap pin (37) meets the top of an adjacent washer (46) and thereby carries central support assembly (30) and feed pan (20) with it.

In operation, hopper (40) is first permitted to rest about cone (21) on the bottom of pan (27) while snap pin (38) is removed from hole (36). After cylinder element (41) is filled with a feed of a particular granular size, it is lifted vertically by handle (47) to a position allowing for a desirable flow rate therefrom into pan (20) between its bottom and the combined bottom (27) and cone (21) of pan (20). At this level, straight element (37) of snap pin (38) is inserted through hole (36) and hopper (40) is permitted to drop until the bottom of one of washers (46) rests upon snap pin (38). As animals consume the feed in pan (20), additional feed will flow into said pan (20) from cylinder element (41) of hopper (40). The vertical height of hopper (40) may be thereafter adjusted by the removal and reinsertion of snap pin (38) until the rate of flow into pan (20) is consistent with the requirements of the current conditions.

The present invention offers the advantages of having all circular openings, including those in the centers of the plurality of washers (46) and hole (36) through support post (34) always filled with another element of the invention during operation, specifically, post (34) within washers (46) and snap pin (38) within hole (36).

Grime, feed and dirt can accumulate between the parallel elements of the upper element of (44) of strap (42), impeding the relocation of snap pin (38). However, these spaces are square cornered and large, permitting the easy, quick removal of any unwanted deposits.

Accordingly, it is believed that all of the objects mentioned above are accomplished by use of the modes for carrying out the invention herein disclosed.

Obviously, many modifications or variations of the present invention are possible in light of the above teachings. It is therefore to be understood that, within the scope of the appended claims, the invention may be practised otherwise than as specifically described.

I claim:

1. A pig feeder of a type having a feed pan and a hopper whose position in relation to said feed pan can be raised or lowered, the improvement comprising a vertical support post fixedly attached to the pan and having an opening through its upper end; means fixedly attached to the hopper for supporting a plurality of vertically spaced and aligned washers through which said support post passes; and a pin for insertion through the support post opening, whereby the hopper may be selectively supported at any of various levels above the feed pan.

2. The pig feeder as described in claim 1 wherein said washer supporting means comprises a strap attached at each end to diametrically opposing points at the upper end of the hopper, said strap being bent in its center so as to provide parallel vertical elements between which the washers are supported.

3. The pig feeder as described in claim 2 further comprising a handle attached to the upper center of said strap, whereby the hopper can be conveniently raised and lowered and the feeder can be moved from location to location.

4. The pig feeder as described in claim 1, wherein the spacing between any two washers is substantially greater than the diameter of said pin, whereby there will be substantial open space below the pin when it is in position.

5. A pig feeder of a type having a feed pan and a hopper whose position in relation to said feed pan can be raised or lowered, the improvement comprising a vertical support post fixedly attached to the pan and having an opening through its upper end; means fixedly attached to the hopper for supporting a plurality of vertically spaced rigid horizontal support members having vertically aligned apertures which are located a substantial distance away from said supporting means and through which said support post passes; and a pin for insertion through the support post opening, whereby the hopper may be selectively supported at any of various levels above the feed pan.

6. The pig feeder as described in claim 5, wherein the spacing between any two rigid horizontal support members is substantially greater than the diameter of said pin, whereby there will be substantial open space below the pin when it is in position.

* * * * *